April 19, 1938.  J. L. KNIGHT  2,114,882

REFRIGERATOR

Filed Sept. 5, 1935

Inventor:
James L. Knight,
by Harry E. Dunham
His Attorney.

Patented Apr. 19, 1938

2,114,882

UNITED STATES PATENT OFFICE 2,114,882

REFRIGERATOR

James L. Knight, Erie, Pa., assignor to General Electric Company, a corporation of New York Application September 5, 1935, Serial No. 39,272

1 Claim. (Cl. 62—89)

My invention relates to refrigerators and more particularly to an arrangement for regulating the circulation of cooling air in the food storage compartments thereof.

Many types of refrigerators, and particularly those designed for household use, include a single heat insulated food storage compartment in which a large variety of articles are stored. The food storage compartment is ordinarily cooled by a cooling unit such as a refrigerant evaporator which may be supplied with liquid vaporizable refrigerant from a compressor-condenser unit. Trays of water, or the like, to be frozen are supported on suitable cooling surfaces of the evaporator and articles such as raw meat which are best preserved at temperatures below 32° F. are also supported thereon. Other articles, such as bottles of milk, are stored on suitable shelves located in the remainder of the food storage compartment which is preferably maintained at a temperature of about 45° F. It is also frequently desirable to preserve vegetables and similar articles in the food storage compartment, which are subject to rapid deterioration due to dehydration. The rate of dehydration of such articles is a function of the quantity of air circulated thereover when the humidity of the air is comparatively low. Further difficulties have been encountered in maintaining the desired temperature and humidity conditions within such a food storage compartment because of the comparatively large changes in ambient temperature to which the exterior surfaces of the compartment are subjected.

It is an object of my invention to provide a refrigerator having a heat insulated food storage compartment and an improved arrangement for regulating the circulation of air therein in order to maintain the desired temperature and humidity conditions in different portions thereof suitable for the preservation of various articles stored therein.

Further objects and advantages of my invention will become apparent as the following description proceeds and the features of novelty which characterize my invention will be pointed out with particularity in the claims annexed to and forming a part of this specification.

Figure 1:
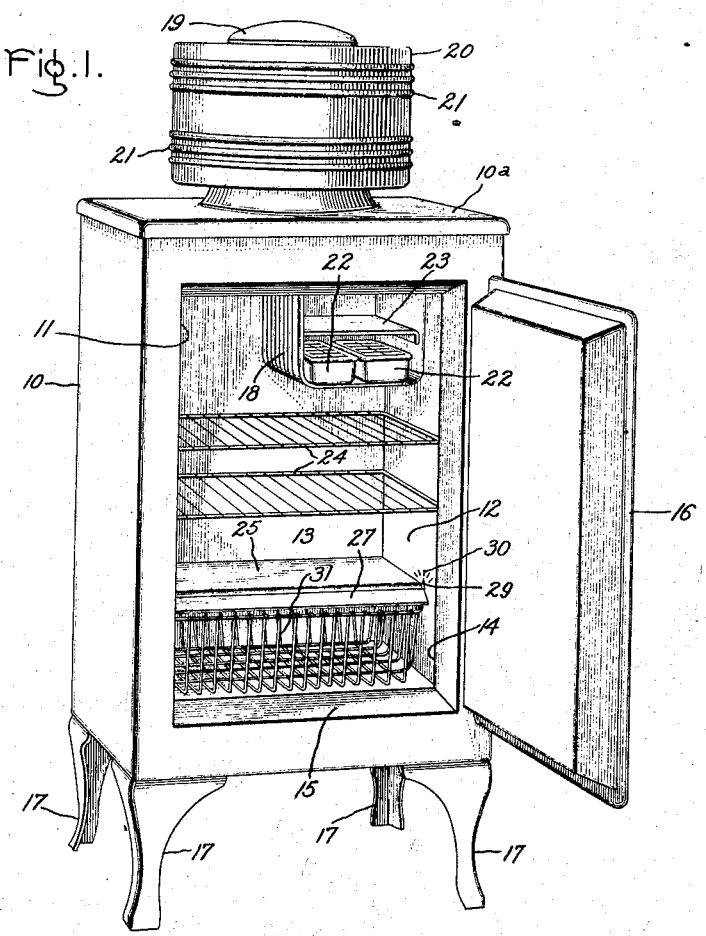
Figure 2:
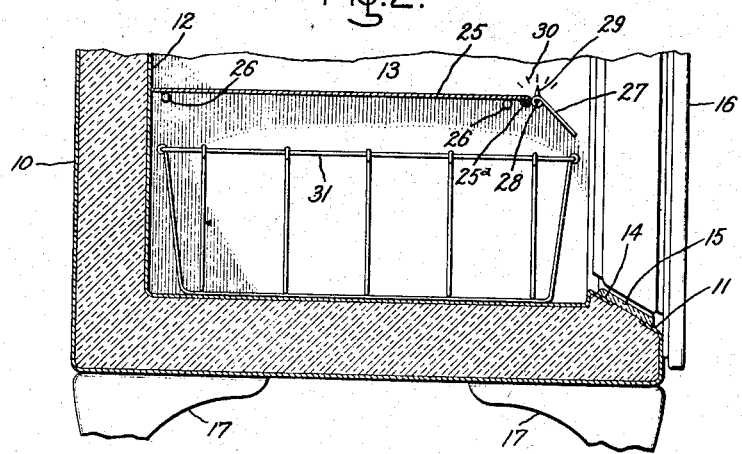

For a better understanding of my invention reference may be had to the accompanying drawing in which Fig. 1 is a perspective view of a refrigerator having a food storage compartment provided with an arrangement for regulating the circulation of air therein embodying my invention and Fig. 2 is fragmentary sectional side elevation of a portion of the refrigerator shown in Fig. 1.

Referring to the drawing, I have shown in Fig. 1 a refrigerator designed for household use provided with a cabinet having a rectangular open-top sheet metal shell 10 provided with a rectangular door opening 11 in the front wall thereof. A rectangular open-top sheet metal inner liner 12 arranged in spaced relation within the outer shell 10 forms a food storage compartment 13 within the cabinet. The front wall of the inner liner 12 is provided with a rectangular door opening 14 therein which registers with the somewhat larger door opening 11 in the outer shell 10, the adjacent edges thereof being secured together by a strip of non-hygroscopic heat insulating material 15. The door opening thus formed in the front wall of the food storage compartment 13 is closed by a suitable heat insulated door 16 which is supported by hinges arranged at the side of the door opening. The cabinet is supported on a series of sheet metal legs 17.

The food storage compartment 13 is cooled by a refrigerating machine supported on a removable heat insulated top wall 10a of the cabinet. The refrigerating machine illustrated includes a U-shaped refrigerant evaporator 18 of the sheet metal type which is supported on the lower side of the removable top wall 10a. Vaporized liquid refrigerant is supplied to the evaporator 18 from a compressor-condenser unit mounted on the upper surface of the removable top wall 10a. Gaseous refrigerant is compressed by a motor driven compressor located in a hermetically sealed casing 19 and is supplied to a cylindrical natural draft air-cooled condenser 20 which extends about the casing 19. The compressed refrigerant circulating through passages 21 of the condenser 20 is cooled by air circulating upwardly over the surfaces of the condenser due to natural draft and is liquefied thereby. This liquid refrigerant is supplied to the evaporator 18 through a suitable regulating valve (not shown) and the liquid refrigerant circulating through the evaporator 18 is vaporized by the absorption of heat from articles supported on the surfaces of the evaporator and from the air circulating in the food storage compartment 13. The refrigerant thus vaporized in the evaporator 18 is returned to the motor driven compressor in the casing 19 and the cycle is repeated and continued until the temperature within the food storage compartment 13 is lowered to the desired value.

In the illustrative form of my invention freezing trays 22 are supported on the lower portion of the evaporator 18 and ice cubes are frozen therein. The evaporator 18 is also provided with an intermediate shelf 23 on which freezing trays, meat or similar articles may be supported, which it is desirable to maintain at a temperature below 32° F. A series of reticulated shelves 24 of wire work construction which permit a free circulation of air therethrough are supported in spaced relation within the food storage compartment 13 and articles to be preserved such as bottles of milk and dishes of food may be placed thereon.

A shelf is arranged in the food storage compartment, the major portion of the surface of which is imperforate, and an arrangement is provided which cooperates with this shelf, to regulate the quantity of air circulated vertically between the upper portion of the food storage compartment above this shelf and the lower portion of the food storage compartment below this shelf. In the illustrative form of my invention an imperforate removable rectangular horizontal sheet metal shelf 25 is supported in the food storage compartment 13 on a series of horizontal studs 26 secured to the side walls of the inner liner 12. The rear and side edges of the sheet metal shelf 25 are arranged in close abutting relation to the rear and side walls of the food storage compartment 13 in order to prevent the circulation of air therebetween. The front edge of the shelf 25 is arranged in spaced relation with respect to the inner wall of the door 16 to define a vertical air passage disposed between the front edge of the shelf and the door and communicating between the upper and the lower portions of the food storage compartment. A rectangular sheet metal shutter 27 extends along the front edge of the shelf 25 and is pivotally supported on a rod 28 the opposite ends of which are journaled in suitable holes provided in the side walls of inner liner 12. The rear edge of the shutter 27 is bent over the rod 28 and is rigidly secured thereto so as to prevent relative displacement of the rod 28 and shutter 27. The ends of the rod 28 are tightly fitted in the holes of the side wall of the inner liner 12 in order that the shutter 27 will remain in any particular position to which it is rotated. The shutter 27 is provided with an index pointer 29 which is rigidly secured thereto and the angular position of the shutter 27 is thus indicated by the index pointer 29 and a series of suitable index marks 30 formed on the adjacent portion of the side wall of the inner liner 12. The shutter 27 is of sufficient width that it extends entirely across the space between the front edge of the shelf 25 and the inner wall of the door 16 when rotated to a horizontal position in alinement with the shelf 25 and cooperates with the shelf 25 and the door 16 to regulate the circulation of air in the food storage compartment 13. It will be noted that the front edge 25a of the shelf 25 is folded over in order to provide a smooth edge in abutting relation with the rear edge of the shutter 27 so as to prevent the leakage of air therebetween. The shelf 25 and the shutter 27 are preferably covered with a coating of vitreous enamel or similar material in order that they shall present smooth easily cleaned surfaces.

In the operation of the refrigerator described above the evaporator 18 is preferably maintained at a temperature above 0° F. and below 32° F., an average temperature of about 20° F. being desirable. The air within the food storage compartment 13 surrounding the evaporator 18 is cooled thereby and since its specific gravity is lowered upon the lowering of the temperature thereof, it circulates downwardly into the lower portion of the food storage compartment 13 while the warmer and hence lighter air in the lower portion of the food storage compartment is displaced and moves upwardly to a position adjacent the evaporator 18 where it is in turn cooled. The air within the food storage is thus circulated therein due to the convection currents set up as described above. The air within the food storage compartment 13 is maintained at an average temperature at about 45° F. Vegetables or other articles which are subject to rapid deterioration due to dehydration are supported in a removable reticulated receptacle or basket 31 of wire work construction below the imperforate shelf 25. Since the dehydration of such articles is a function of the quantity of air circulated thereover when the humidity of the air is low, it is desirable that the quantity of air circulated over the articles contained in the basket 31 be limited to a minimum amount compatible with the maintenance of the temperature necessary for their proper preservation. The humidity of the air within the food storage compartment 13 is usually comparatively low since the surfaces of the evaporator 18 are maintained at a temperature susbtantially below the average temperature of the air and as a consequence the moisture in the air within the food storage compartment is rapidly condensed on the surfaces of the evaporator. By means of the shutter and shelf arrangement which I have provided, the quantity of air circulated between the upper portion of the food storage compartment above the shelf 25 and the lower portion of the food storage compartment 13 below the shelf 25 may be regulated in order to limit the amount of air circulated through the lower portion of the compartment to the minimum amount required in order to maintain the articles in the basket 31 at the desired temperature. These articles may be maintained at a temperature slightly higher than that prevailing in the upper part of the food storage compartment, that is at a temperature of approximately 50° F., if desired. The transfer of heat from the lower portion of the food storage compartment to the upper portion thereof with a minimum circulation of air is also facilitated by the particular shelf construction which I have provided since the shelf 25 is made of metal and has a relatively high heat conductivity. The position of the shutter 27 may be varied in accordance with the temperature of the air outside the cabinet. During the hot summer months when the outside temperature is high and hence the heat leakage to the interior of the cabinet is high, the shutter 27 may be rotated downwardly to a vertical position in which the maximum amount of circulation of air between the upper and lower portions of the food storage compartment 13 is provided. During the cold winter months the temperature outside the cabinet is relatively low and, as a consequence, a comparatively small amount of heat leaks into the interior of the cabinet. Consequently, the shutter 27 may be rotated to a horizontal position or to a position in which only a small amount of circulation of air is permitted. It will thus be seen that I have provided an arrangement in which a minimum amount of cooling air is circulated through the lower portion of the food storage compartment in order that the relative humidity in the lower portion of the food storage compartment is maintained at a maximum value and hence the dehydration of articles stored therein is minimized.

While I have shown a particular embodiment of my invention in connection with a household type refrigerator, I do not desire my invention to be limited to a particular construction shown and described and I intend in the appended claim to cover all modifications within the spirit and scope of my invention.

What I claim as new and desire to secure by Letters Patent of the United States, is:—

A refrigerator provided with a heat insulated food storage compartment having bottom and top and side walls and having a door opening in the front wall thereof, a heat insulated door for closing said door opening, means including a refrigerant evaporator located in the upper portion of said food storage compartment for cooling said food storage compartment and for circulating air therein, an imperforate horizontal sheet metal shelf extending across said food storage compartment above the bottom wall thereof and below said evaporator, said shelf having at least three edges thereof arranged in close abutting relation to said side walls of said food storage compartment and dividing said food storage compartment into upper and lower portions accessible through said door opening, the front edge of said shelf being arranged in spaced relation with respect to said door to define a vertical air passage disposed between the front edge of said shelf and said door and communicating between the upper and the lower portions of said food storage compartment, and means including a shutter pivotally supported between said front edge of said shelf and said door and cooperating with said shelf and said door for regulating the quantity of air circulating vertically through said air passage and between the upper portion of said food storage compartment above said shelf and the lower portion of said food storage compartment below said shelf.

JAMES L. KNIGHT.